Nov. 24, 1959

H. K. GLEASMAN 2,914,152

SEMI-AUTOMATIC TWO-SPEED HUB AND BRAKE FOR BICYCLES

Filed Dec. 31, 1957

WITNESS:
Esther M. Stockton

INVENTOR.
Hollis K. Gleasman
BY
Clinton S. Janes
ATTORNEY

Nov. 24, 1959     H. K. GLEASMAN     2,914,152
SEMI-AUTOMATIC TWO-SPEED HUB AND BRAKE FOR BICYCLES
Filed Dec. 31, 1957     2 Sheets-Sheet 2
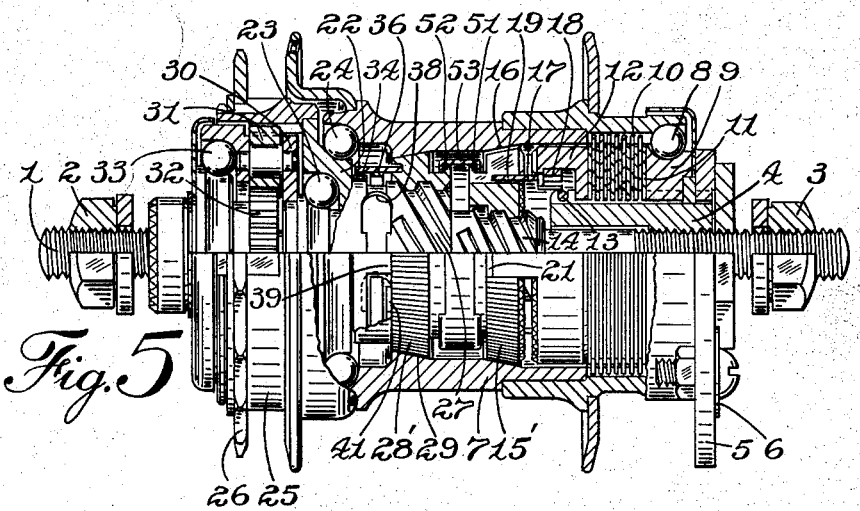
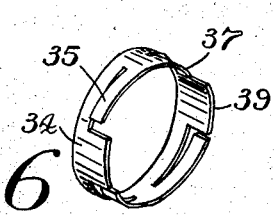
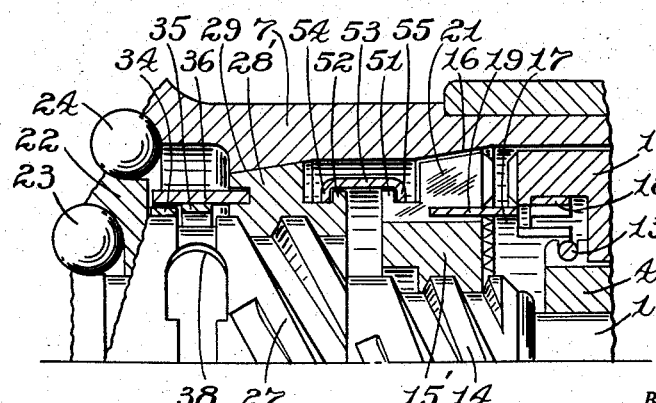
INVENTOR.
Hollis K. Gleasman
BY
Clinton S. Janes
ATTORNEY
WITNESS:
Esther M. Stockton

United States Patent Office 2,914,152
Patented Nov. 24, 1959

2,914,152

SEMI-AUTOMATIC TWO-SPEED HUB AND BRAKE FOR BICYCLES

Hollis K. Gleasman, Elmira, N.Y., assignor to Bendix Aviation Corporation, Elmira Heights, N.Y., a corporation of Delaware Application December 31, 1957, Serial No. 706,363

4 Claims. (Cl. 192—6)

The present invention relates to a semi-automatic two-speed hub and brake for bicycles and more particularly to a device of this type in which the change in gear ratio is effected by back-pedaling slightly, incorporating means for preventing the brake from locking or jamming when rolled backward.

When a bicycle with a semi-automatic two-speed hub such as shown for instance in the patent to Olson 813,464 or the application of Gleasman Serial No. 682,933 filed September 9, 1957, is wheeled backward, as for instance to park it in a stand, if the hub is in high gear at the time, the backward rotation of the hub is transmitted by the high speed clutch to the high speed screw shaft, and through the reduction gearing to the low speed screw shaft whereby the low speed clutch nut may be traversed to engage and operate the brake applying means. Since in such case the force exerted by the operator is multiplied by the ratio of the radius of the wheel to that of the high speed screw shaft, and by the ratio of the reduction gearing, the brake may inadvertently be applied with such force as to make it difficult to release.

It is an object of the present invention to provide a semi-automatic two-speed hub and brake incorporating novel means for preventing the application of the brake by backward movement of the vehicle.

It is another object to provide such a device which is positive in action, simple in construction, and involves no additional frictional drag during the normal operation of the device.

Further objects and advantages will be apparent from the following description taken in connection with the accompanying drawings in which:

Fig. 5 is a view similar to Fig. 1 showing a second embodiment of the means for preventing the locking of the brake;

Fig. 6 is a detail in perspective of the selector sleeve;

Fig. 7 is a detail in perspective of the swivelling sleeve for limiting the separation of the clutch nuts; and Fig. 8 is an enlarged detail of the clutching mechanism shown in Fig. 5.

Figure 1:
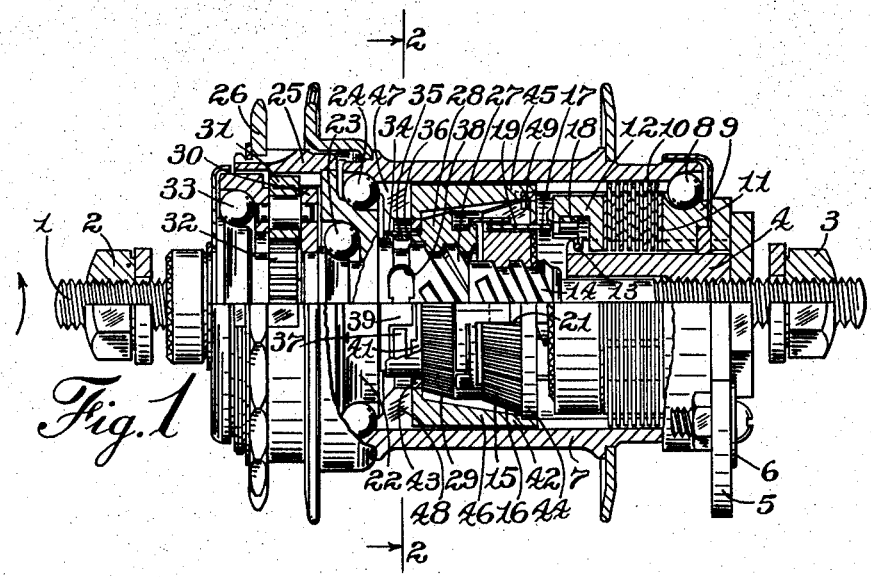
Fig. 1 is a side elevation, partly broken away and in section, of a preferred embodiment of the invention showing the parts in high gear position.
Figure 2:
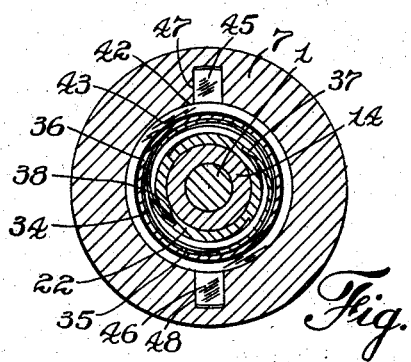
Fig. 2 is a section taken substantially on the line 2—2 of Fig. 1.

In Fig. 1 of the drawing there is illustrated a fixed axle 1 adapted to be clamped in the rear fork of a bicycle by the clamp nuts 2, 3. A brake anchor member 4 is adjustably mounted on the axle 1 and prevented from rotation by a torque arm 5 adapted to be connected to the frame of the bicycle by a clip 6 in the customary manner. A hub 7 is rotatably mounted on the axle 1 by means of a bearing 8 cooperating with a backing plate 9 keyed on said axle. A plurality of brake discs 10, 11 are splined alternately to the interior of the hub 7 and to he brake anchor member 4, and a brake applying ring 12 is splined on the anchor member 4 in position to compress the brake discs against the backing plate 9 and thereby apply the brake. The ring 12 is retained on the anchor member 4 by means of a lock ring 13. A low speed screw shaft 14 is journalled on the axle 1 and has a low speed clutch nut 15 threaded thereon formed with a conical surface adapted to engage a conforming surface 16 in the interior of the hub. Traversal of the clutch nut 15 by rotation of the screw shaft 14 is insured by means of a drag member 17 having a spring arm 18 frictionally engaged in a counterbore in the brake applying ring 12 and having an arm 19 extending into a slot 21 in the clutch nut 15 to form a splined connection therewith.

A high speed driving member indicated generally by numeral 22 is rotatably mounted on the low speed screw shaft 14 by means of bearings 23 and supports the hub 7 by means of bearings 24. The driving member 22 comprises an orbit gear 25 arranged to be driven by a sprocket 26 fixedly mounted thereon and also embodies a high speed screw shaft 27 on which a high speed clutch nut 28 is threaded for longitudinal movement into and out of engagement with a conforming clutch surface 29 in the interior of the hub.

A planet carrier 30 is fixed on the low speed screw shaft 14, and mounts a plurality of planetary pinions 31 meshing with the orbit gear 25 and with a fixed sun gear member 32. The outer end of the planet carrier is supported on a bearing 33 resting on the fixed sun gear member.

Means under the control of the operator is provided for governing the engagement of the high speed clutch nut 28 with the hub in order to select the desired gear ratio to be used. For this purpose, a selector sleeve 34 is rotatably mounted on the driving member 22 adjacent the screw shaft portion 27. This sleeve is formed with a plurality of spring arms 35 bearing frictionally within a ring member 36 fixed in any suitable manner to the high speed clutch nut 28 and surrounding the sleeve 34. Sleeve 34 also has a plurality of inwardly extending ratchet arms 37 adapted to engage in notches 38 formed in the periphery of the high speed screw shaft 27.

The sleeve 34 is provided with a pair of axial projections 39, and the high speed clutch nut 28 is formed with a pair of similar projections 41 extending toward the sleeve 34. When the projections 39, 41 are in alignment with each other so that they come into abutting relation, the high speed clutch nut 28 is prevented from engaging the clutch surface 29 of the hub, and forward rotation of the sprocket 26 by the operator is transmitted to the hub through the reduction gearing and the low speed clutch. On the other hand when the sleeve is indexed, by a momentary backward rotation of sprocket 26, to a position where the projections 39 are out of registry with the projections 41, the high speed clutch is permitted to close as shown in Fig. 1, and resumption of forward rotation of sprocket 26 rotates hub 7 at the same speed.

Figure 3:
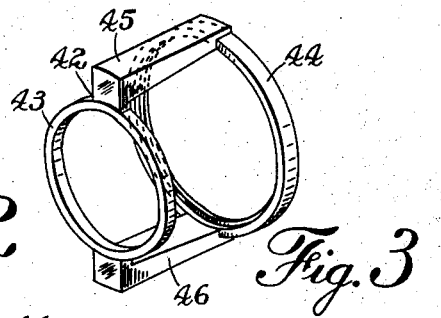
Fig. 3 is a detail in perspective of the cage member restricting the separation of the high speed and low speed clutch nuts.
Figure 4:
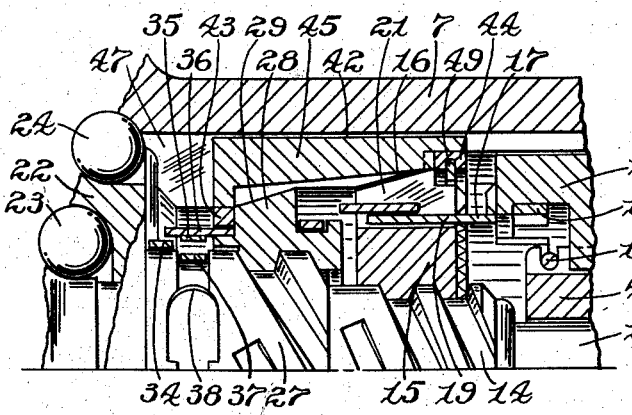
Fig. 4 is an enlarged detail of the clutching mechanism shown in Fig. 1.

Means are provided for limiting the separation of the high speed and low speed clutch nuts 28, 15, so that the low speed clutch nut cannot come into contact and actuate the brake applying ring 12 when the high speed clutch is engaged. As best shown in Fig. 3, this means comprises a cage member indicated generally by numeral 42 comprising end rings 43, 44 joined by bars 45, 46 which bars are slidable in axial slots 47, 48 formed in the interior of the hub 7. The ring 43 is adapted to bear on the outer face of the high speed clutch nut 28, as shown in Fig. 4. The ring 44 is of sufficient internal diameter to admit the low speed clutch nut 15 into the cage and a split thrust ring 49 is seated in the end ring 44 in such position as to engage the adjacent face of the low speed clutch nut and maintain the low speed clutch nut substantially spaced from the brake actuating ring 12 when the high speed clutch is closed.

The operation of the lock prevention means is as follows:

With the high speed clutch nut 28 in engagement with the clutch surface 29 of the hub, if the hub 7 is rotated backward, that is in the direction of the arrow in Fig. 1, the rotation of the hub is transmitted through the clutch nut 28, screw shaft 27, driving member 22 and gearing 25, 31, 32, to the planet carrier 30 and the low speed screw shaft 14. This rotation of the low speed screw shaft traverses the low speed clutch nut 15 to the right, but before it moves into proximity to the brake actuating ring 12 the thrust ring 49 of the cage arrests its axial movement, and the low speed shaft and clutch nut rotate backward idly together.

When the operator wishes to shift to low gear, the selector sleeve 34 (Fig. 6) is indexed to bring its projections 39 into registry with the projections 41 of the high speed clutch nut by backward rotation of the sprocket 26 and the parts actuated thereby. When this occurs, the high speed clutch nut is held out of engagement with the hub, and the low speed clutch nut 15 is consequently permitted to engage the clutch surface 16 of the hub on forward rotation of the driving means. If, under these circumstances, the hub 7 should be rotated backward, the low speed clutch nut 15 maintains its engagement with the hub and no locking of the brake mechanism will occur.

In Figs. 5, 7 and 8 of the drawings a second embodiment of the invention is illustrated utilizing a different structure for limiting separation of the clutch nuts.

The hub, driving means and brake are all constructed the same as Fig. 1 and the parts are similarly numbered. In this case however the clutch nuts 15', 28' are formed with contiguous flanges 51, 52, and a split sleeve 53 having internal flanges 54, 55 is arranged to surround the adjacent ends of the clutch nuts and limit their separation by engagement with the flanges 51, 52; thereby forming a swivel connection between the clutch nuts. The split sleeve 53 is formed of elastic material and preset to bear frictionally on both control nuts and thus convey the retarding effect of retarder 17 to ensure traversal of the high speed control nut 28.

The operation of this embodiment of the invention is the same as previously set forth.

Although but two embodiments of the invention have been shown and described in detail it will be understood that changes may be made in the design and arrangement of the parts without departing from the spirit of the invention.

I claim:

1. In a two-speed hub and brake for velocipedes and the like a fixed axle, a wheel hub rotatably mounted thereon, a brake for said hub, a low-speed screw shaft journalled on the axle, a low-speed clutch nut threaded on said shaft for movement, by forward rotation of the shaft, into clutching engagement with the hub, and moved by backward rotation of the shaft to apply the brake; a high-speed screw shaft rotatably mounted on the low-speed shaft, a high-speed clutch nut threaded on the high-speed shaft for movement by forward rotation of its shaft into clutching engagement with the hub, driving means for the high-speed shaft, reduction gearing connecting said shafts, manually controllable means for preventing the high-speed clutch nut from engaging the hub, and means for preventing brake-applying movement of the low-speed clutch nut when the high-speed clutch nut is in engagement with the hub; in which said means for preventing brake-applying movement of the low-speed clutch nut comprises means for limiting the axial separation of said clutch nuts.

2. A device as set forth in claim 1 in which said limiting means is in the form of a cage member slidably but non-rotatably mounted in the hub having thrust bearings adapted to engage the outwardly-facing surfaces of the clutch nuts.

3. A device as set forth in claim 1 in which said limiting means comprises a collar forming a connection between the clutch nuts which limits their separation while permitting relative rotation.

4. A device as set forth in claim 3 including further a frictional retarder for the low-speed clutch nut to ensure its traversal by rotation of its screw shaft, said collar having means forming a frictional connection from the low-speed clutch nut to the high-speed clutch nut to ensure the traversal of the latter by rotation of its screw shaft.

References Cited in the file of this patent

UNITED STATES PATENTS

| 942,520 | Rockwell | Dec. 7, 1909 |
| 2,765,678 | Hood | Oct. 9, 1956 |